(12) United States Patent
Takaki (10) Patent No.: US 12,392,870 B2
(45) Date of Patent: Aug. 19, 2025

(54) TARGET RECOGNITION DEVICE

(71) Applicant: DENSO CORPORATION, Kariya (JP)

(72) Inventor: Masanari Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 347 days.

(21) Appl. No.: 17/821,117

(22) Filed: Aug. 19, 2022

(65) Prior Publication Data

US 2022/0397644 A1     Dec. 15, 2022

Related U.S. Application Data

(63) Continuation of application No. PCT/JP2021/005690, filed on Feb. 16, 2021.

(30) Foreign Application Priority Data

Feb. 21, 2020   (JP) ................................. 2020-028460

(51) Int. Cl.
*G01S 7/41* (2006.01)
*G01S 13/88* (2006.01)

(52) U.S. Cl.
CPC ............. *G01S 7/415* (2013.01); *G01S 13/88* (2013.01)

(58) Field of Classification Search
CPC .... G01S 13/931; G01S 13/505; G01S 13/584; G01S 13/588; G01S 13/723; G01S 13/60; G01S 13/726; G01S 13/865; G01S 13/93; G01S 17/931; G01S 17/58; G01S 2013/9321; G01S 2013/93271; G01S 7/415; G01S 7/4802; B60W 2420/408; G06V 20/58

See application file for complete search history.

(56) References Cited

U.S. PATENT DOCUMENTS

| | | | |
|---|---|---|---|
| 10,281,573 B1* | 5/2019 | Ponsford | G01S 13/66 |
| 2011/0128547 A1* | 6/2011 | Beppu | G01S 17/931 |
| | | | 356/445 |
| 2018/0330509 A1* | 11/2018 | Watanabe | G08G 1/16 |
| 2019/0179002 A1* | 6/2019 | Takayama | G01S 13/726 |
| 2021/0080558 A1* | 3/2021 | Gosala | G01S 13/931 |

OTHER PUBLICATIONS

Coraluppi, Stefano; Carthel, Craig. Modified Scoring in Multiple-Hypothesis Tracking. Journal of Advances in Information Fusion. Dec. 2012, International Society of Information Fusion, vol. 7, No. 2, pp. 153-164. (Year: 2012).*

* cited by examiner

*Primary Examiner* — Olumide Ajibade Akonai
(74) *Attorney, Agent, or Firm* — Maschoff Brennan (57) ABSTRACT

A target recognition device includes a target recognition unit, a tracking unit, a target registration unit, a condition determination unit, and a registration requirement setting unit. The condition determination unit determines whether a target satisfies predetermined conditions J1 to J3. The registration requirement setting unit sets a requirement for registering a target by the target registration unit to be stricter for the target determined to satisfy all of the conditions J1 to J3 than for the target determined to satisfy not all of the conditions J1 to J3.

4 Claims, 5 Drawing Sheets

TARGET RECOGNITION DEVICE

CROSS-REFERENCE TO RELATED APPLICATION

The present application is based on and claims the benefit of priority from earlier Japanese Patent Application No. 2020-028460 filed on Feb. 21, 2020, the description of which is incorporated herein by reference.

BACKGROUND

Technical Field

The present disclosure relates to a target recognition device.

Related Art

A target recognition device recognizes a target by using a laser radar.

SUMMARY

An aspect of the present disclosure is a target recognition device including: a target recognition unit configured to repeat a cycle including processing that radiates radar waves to detect reflection points and processing that recognizes a target by performing clustering for the reflection points; a tracking unit configured to determine continuity between targets recognized in the respective cycles; a target registration unit configured to register targets determined to have continuity by the tracking unit during the cycles the number of which is a threshold value or more; a condition determination unit configured to determine whether targets not registered by the target registration unit satisfy following conditions J1 to J3; and a registration requirement setting unit that sets a requirement for registering the target by the target registration unit to be stricter for targets determined to satisfy all of the conditions J1 to J3 than for targets determined to satisfy not all of the conditions J1 to J3.

The condition J1 is that a ratio of the reflection points having a reflection intensity equal to or lower than a first reference intensity with respect to the reflection points configuring the target to be determined by the condition determination unit.

The condition J2 is that the target including the reflection points having a reflection intensity equal to or higher than a second reference intensity, which is higher than the first reference intensity, is present around the target to be determined by the condition determination unit.

The condition J3 is that a distance between the reflection points having a reference intensity equal to or higher than the second reference intensity and the target to be determined by the condition determination unit is a reference distance or less.

DETAILED DESCRIPTION OF THE PREFERRED EMBODIMENTS

JP 2011-117799 A discloses a target recognition device. The target recognition device recognizes a target by using a laser radar.

Detailed studies by the inventor found the following problem. The laser radar radiates radar waves to detect reflection points. The target recognition device recognizes a target based on the reflection points. The reflection points may include ghosts or the like. The target recognition device may recognize the ghost or the like as a target and use the target for vehicle control or the like.

An aspect of the present disclosure preferably provides a target recognition device that can suppress recognizing a ghost or the like as a target and using the target for vehicle control or the like.

Exemplary embodiments of the present disclosure will be described with reference to the drawings.

First Embodiment

1. Configuration of Target Recognition Device 1

Figure 1:
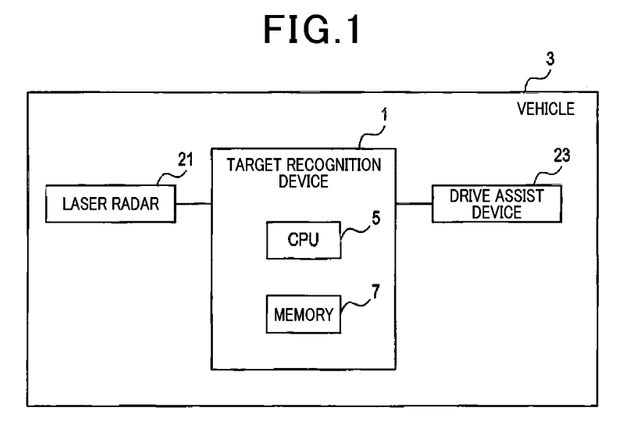
FIG. 1 is a block diagram illustrating a configuration of a target recognition device.

A configuration of the target recognition device 1 will be described with reference to FIG. 1 and FIG. 2. As illustrated in FIG. 1, the target recognition device 1 is installed in a vehicle 3. The target recognition device 1 includes a microcomputer having a CPU 5 and a semiconductor memory (hereinafter, referred to as a memory 7) such as a RAM and a ROM.

Functions of the target recognition device 1 are implemented by the CPU 5 executing a program stored in a non-transitory tangible storage medium. In this example, the memory 7 corresponds to the non-transitory tangible storage medium storing the program. Executing the program performs a method corresponding to the program. The target recognition device 1 may include one microcomputer or a plurality of microcomputers.

Figure 2:
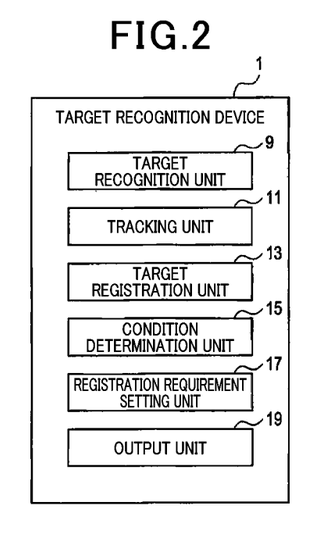
FIG. 2 is a block diagram illustrating a functional configuration of the target recognition device.

As illustrated in FIG. 2, the target recognition device 1 includes a target recognition unit 9, a tracking unit 11, a target registration unit 13, a condition determination unit 15, a registration requirement setting unit 17, and an output unit 19.

The target recognition device 1 is connected to various members included in the vehicle 3. As illustrated in FIG. 1, the members connected with the target recognition device 1 include a laser radar 21 and a drive assist device 23.

The laser radar 21 is used for detecting a target present around the vehicle 3. The laser radar 21 radiates radar waves to detect reflection points. The reflection points are generated by the radar waves reflected from the target. The laser radar 21 repeatedly radiates radar waves and detects reflection points while changing the direction of radiation of the radar waves. The area to which radar waves are radiated is defined as a scan area. The laser radar 21 can detect a target in the scan area.

The drive assist device 23 acquires information on a registered target from the target recognition device 1. The registered target will be described later. The drive assist device 23 performs drive assist by using information on the registered target. The drive assist includes, for example, a process for performing deceleration, steering, warning, and the like to suppress excessive approach to the registered target.

2. Process Performed by Target Recognition Device 1

A process repeatedly performed at every predetermined time period by the target recognition device 1 will be described with reference to FIG. 3 to FIG. 6. Performing the process illustrated in FIG. 3 once is defined as one cycle. In step S1 in FIG. 3, the target recognition unit 9 uses the laser radar 21 to sequentially radiate radar waves to the whole scan area and detect reflection points. Each reflection point includes information on a reflection intensity.

Figure 3:
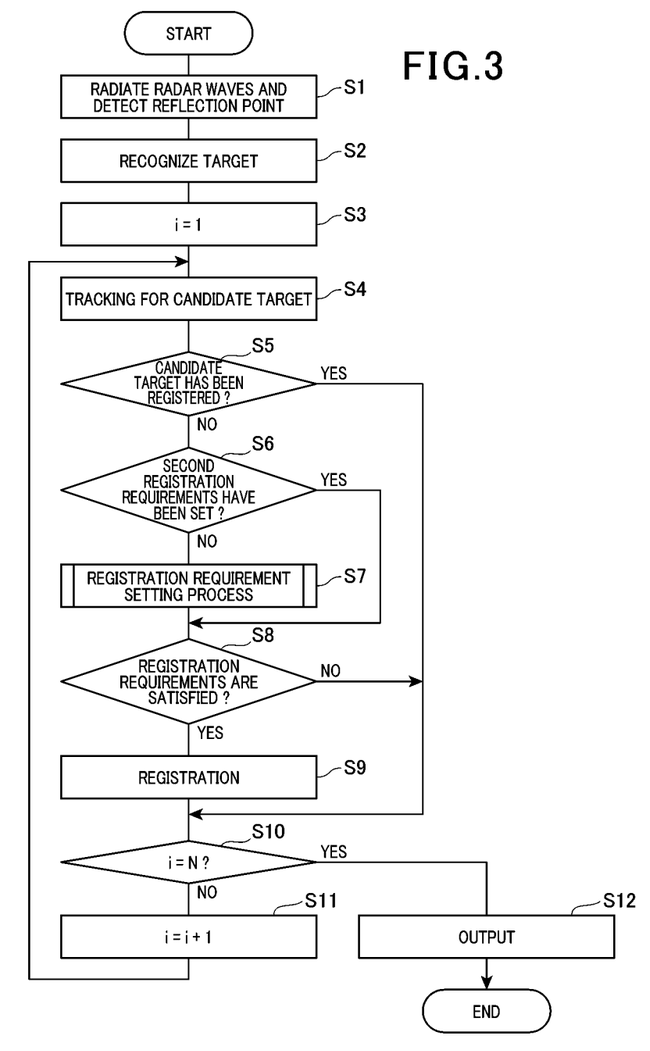
FIG. 3 is a flowchart of a process performed by the target recognition device.

In step S2, the target recognition unit 9 performs clustering for the reflection point detected in the step S1 based on the location of the reflection point or the like to recognize a target. Each target includes one or more reflection points.

In step S3, the target recognition unit 9 initializes i, which is a number of a target, to 1. The number of a target is a serial number assigned to a target recognized in processing of the step S2 in the current cycle. Herein, it is assumed that N targets are recognized in the processing of the step S2. N is a natural number. Any of numbers 1, 2, 3, ... N is assigned to each target. The numbers assigned to the respective targets differ from each other.

In step S4, the tracking unit 11 performs tracking for the target whose number is i (hereinafter, referred to as a candidate target or a selected target) by the following method.

The tracking unit 11 predicts, based on a location and a velocity of a target recognized in a previous cycle (hereinafter, referred to as a previous target), a location of the previous target in the current cycle. The tracking unit 11 sets a connection range centering on the predicted location. In the connection range, the previous target is likely to be detected in the current cycle.

When a candidate target is present in the connection range, the tracking unit 11 determines that there is continuity between the candidate target and the previous target. If there is continuity between the candidate target and the previous target, it is highly likely that the previous target and the candidate target are the same. The tracking unit 11 calculates a location and a velocity of the candidate target by using information on the previous target and information on the candidate target.

In step S5, the target registration unit 13 determines whether the candidate target has been already registered. The wording "the candidate target has been already registered" means that a target that has been recognized in a past cycle and determined to have continuity with the candidate target as a result of tracking has been already registered.

If the candidate target has not been registered yet, the present process proceeds to step S6. If the candidate target has been already registered, the present process proceeds to step S10.

In step S6, the registration requirement setting unit 17 determines whether second registration requirements have been already set for the target having continuity with the candidate target. The second registration requirements will be described later. The target having continuity with the candidate target is a target that is recognized in a past cycle and is determined to have continuity with the candidate target as a result of tracking.

If the second registration requirements have not been set yet for the target having continuity with the candidate target, the present process proceeds to step S7. If the second registration requirements have been already set for the target having continuity with the candidate target, the present process proceeds to step S8.

In step S7, a registration requirement setting process is performed. The registration requirement setting process will be described with reference to FIG. 4. In step S21 in FIG. 4, the condition determination unit 15 calculates a low-reflection point ratio of a candidate target. The low-reflection point ratio is a ratio of reflection points having a reflection intensity equal to or lower than a first reference intensity with respect to the reflection points configuring the candidate target. The total number of the reflection points configuring the candidate target is A. Among the reflection points configuring the candidate target, the number of reflection points having a reflection intensity equal to or lower than the first reference intensity is B. The low-reflection point ratio is B/A. The first reference intensity is a fixed value set in advance.

Figure 4:
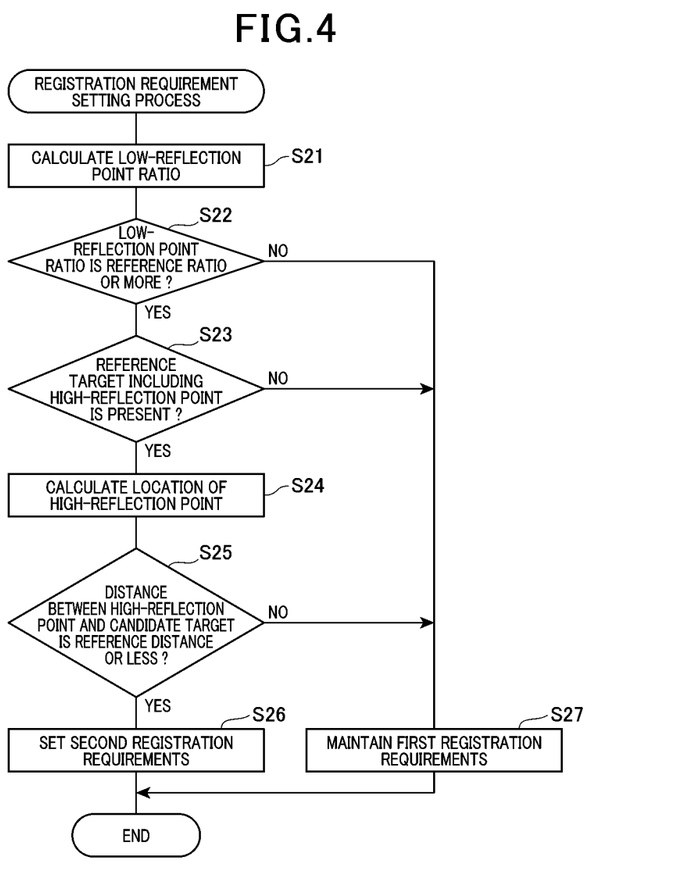
FIG. 4 is a flowchart of a registration requirement setting process performed by the target recognition device.

In step S22, the condition determination unit 15 determines whether the low-reflection point ratio calculated in the step S21 is a reference ratio or more. The reference ratio is a fixed value set in advance. The candidate target corresponds to a target to be determined by the condition determination unit 15. If the low-reflection point ratio is the reference ratio or more, the present process proceeds to step S23. The low-reflection point ratio being the reference ratio or more corresponds to the satisfaction of condition J1. If the low-reflection point ratio is less than the reference ratio, the present process proceeds to step S27.

In step S23, the condition determination unit 15 determines whether a reference target including a high-reflection point is present around the candidate target. The high-reflection point is a reflection point having a reflection intensity equal to or higher than a second reference intensity. The second reference intensity is a fixed value set in advance. The second reference intensity is higher than the first reference intensity.

The wording "a reference target is present around the candidate target" means that, for example, (a) the distance between a left end lateral location of the candidate target and a right end lateral location of the reference target is a threshold level or less and (b) the distance between a left end lateral location of the reference target and a right end lateral location of the candidate target is a threshold level or less. Satisfying (a) and (b) means that the reference target and the candidate target are close to each other in the lateral direction. The lateral direction is the width direction of the vehicle 3. The left end lateral location of the target is a location of the left end of the target in the lateral direction. The right end lateral location of the target is a location of the right end of the target in the lateral direction.

The reference target is any of targets recognized in the step S2 except the candidate target. If a reference target including a high-reflection point is present, the present process proceeds to step S24. The presence of a reference target including a high-reflection point corresponds to satisfying condition J2. If no reference target including a high-reflection point is present, the present process proceeds to step S27.

In step S24, the condition determination unit 15 calculates the location of the high-reflection point included in the reference target determined to be present in the step 23. If the reference target includes a plurality of high-reflection points, the condition determination unit 15 calculates the locations of the respective high-reflection points.

Figure 5:
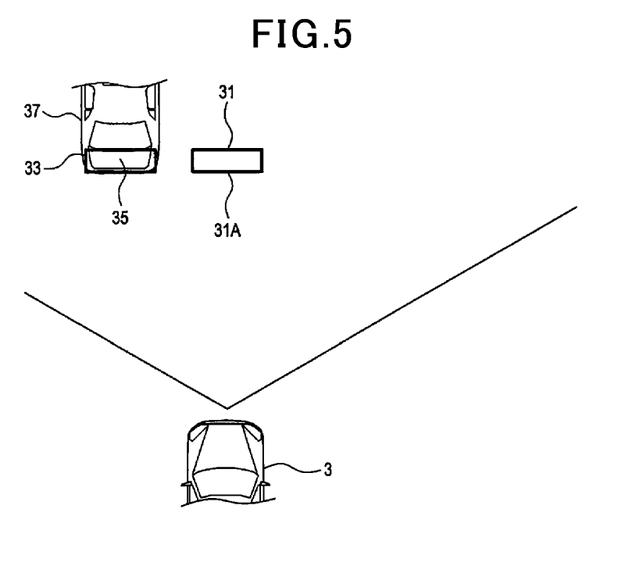
FIG. 5 is an explanatory diagram illustrating an example of an candidate target, a reference target, and a high-reflection point.

In step S25, the condition determination unit 15 determines whether the distance between the location of at least one high-reflection point calculated in the step S24 and the location of the candidate target is a reference distance or less. The location of the candidate target is, as illustrated in FIG. 5, a center location of an end portion 31A on the vehicle 3 side of a candidate target 31. FIG. 5 illustrates an example of a reference target 33 and a high-reflection point 35. When the reference target 33 is part of another vehicle 37, the reference target 33 is likely to include a high-reflection point. The reference distance is a fixed value set in advance.

The distance between the location of the high-reflection point and the location of the candidate target is, for example, a distance between the location of the high-reflection point and the location of the candidate target in the longitudinal direction. The longitudinal direction is a front-back direction of the vehicle 3. The distance between the location of the high-reflection point and the location of the candidate target may be a distance between two points in the coordinate system having a longitudinal direction and a lateral direction, or a distance difference between the two points.

If the distance between the location of at least one high-reflection point and the location of the candidate target is the reference distance or less, the present process proceeds to step S26. The distance between the location of at least one high-reflection point and the location of the candidate target being the reference distance or less corresponds to the satisfaction of condition 3. If the distances between the locations of all the high-reflection points and the location of the candidate target are more than the reference distance, the present process proceeds to step S27.

Figure 6:
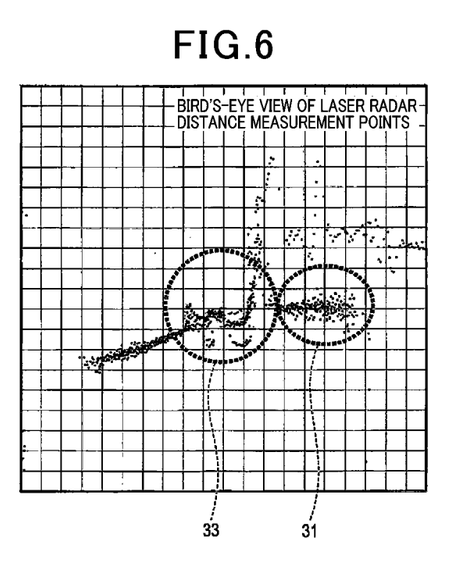
FIG. 6 is a bird's-eye view of laser radar distance measurement points.

An example in which positive determinations are made in the steps 22, 23, and 25 is illustrated in FIG. 6. FIG. 6 is a bird's-eye view of laser radar distance measurement points. The laser radar distance measurement points correspond to reflection points. The reference target 33 is another vehicle. The candidate target 31 is a ghost due to the reference target 33 and is erroneously recognized as a target.

Since the candidate target 31 is due to a ghost, the low-reflection point ratio of the candidate target 31 is the reference ratio or more. Since the reference target 33 is another vehicle, the reference target 33 includes high-reflection points. Since the candidate target 31 is a ghost due to the reference target 33, the distance between the location of the high-reflection point included in the reference target 33 and the location of the candidate target 31 is the reference distance or less.

In step S26, the registration requirement setting unit 17 sets the second registration requirements. The second registration requirements are used for determination in step S8 described later. The second registration requirements are that the candidate target has continuity during cycles the number of which is a second threshold value or more. The second threshold value is a fixed value set in advance. The second threshold value is more than a first threshold value described later. Since the second threshold value is more than the first threshold value, the second registration requirements are stricter than the first registration requirements. The wording "strict" means that satisfying the registration requirements is difficult.

In step S27, the registration requirement setting unit 17 maintains the first registration requirements. The first registration requirements are used for determination in step S8 described later. The first registration requirements are that the candidate target has continuity during cycles the number of which is the first threshold value or more. The first threshold value is a fixed value set in advance. The first threshold value is less than the second threshold value.

Returning back to FIG. 3, in step S8, the target registration unit 13 determines whether the candidate target satisfies the registration requirements. The registration requirements are the second registration requirements if it is determined that the second registration requirements have been set for a target having continuity with the candidate target in the processing of the step S6 or if the second registration requirements are set for the candidate target in the processing of the step S26. In other cases, the registration requirements are the first registration requirements.

If the registration requirements are the first registration requirements, the determination whether the candidate target has continuity during cycles the number of which is the first threshold value or more is made in step 8. If the candidate target has continuity during cycles the number of which is the first threshold value or more, the registration requirements are satisfied.

If the registration requirements are the second registration requirements, the determination whether the candidate target has continuity during cycles the number of which is the second threshold value or more is made in step 8. If the candidate target has continuity during cycles the number of which is the second threshold value or more, the registration requirements are satisfied.

If the candidate target satisfies the registration requirements, the present process proceeds to step S9. If the candidate target does not satisfy the registration requirements, the present process proceeds to step S10.

In step S9, the target registration unit 13 registers the candidate target.

In step S10, the target registration unit 13 determines whether the number i is equal to N. If the number i is less than N, the present process proceeds to step S11. If the number i is equal to N, the present process proceeds to step S12. The number i being equal to N means that the processing in the steps S4 to S9 are completed for all the targets recognized in the processing of the step S2.

In step S11, the number i is incremented by 1. Then, the present process proceeds to step S4.

In step S12, the output unit 19 outputs information on N targets to the drive assist device 23. The output information includes contents such as locations and velocities of the respective targets. In addition, the output information includes contents indicating which target is registered.

The drive assist device 23 can perform drive assist by using information on the target that is registered. For example, the drive assist device 23 can set a priority of information on the target that is not registered to be lower than that of the information on the target that is registered. For example, the drive assist device 23 can set the information on the target that is not registered not to be used for the drive assist. The drive assist corresponds to vehicle control.

3. Effects Provided by Target Recognition Device 1

(1A) In a case of a target that is determined to satisfy all of conditions J1 to J3, the target recognition device 1 sets the requirements for registering the target to be stricter compared with a case of a target that is determined to satisfy not all of conditions J1 to J3. The target determined to satisfy all of conditions J1 to J3 is highly likely to be a ghost or the like erroneously recognized as a target. Hence, the target recognition device 1 can suppress registering the ghost or the like as a target.

(1B) The target recognition device 1 uses the laser radar 21 to radiate radar waves and detects reflection points. Hence, the target can recognize a target further correctly.

(1C) In a case of a target that is determined to satisfy all of conditions J1 to J3, the target recognition device 1 sets the threshold value used in the processing of the step S8 to be larger compared with a case of a target that is determined to satisfy not all of conditions J1 to J3. Hence, the target recognition device 1 can further suppress registering the ghost or the like as a target.

Second Embodiment

1. Differences from First Embodiment

Since a basic configuration of the second embodiment is similar to that of the first embodiment, the differences will be described below. The same reference signs as those in the first embodiment denote the same configurations, which refer to the preceding descriptions.

In the first embodiment described above, the second registration requirements are that the candidate target has continuity during cycles the number of which is the second threshold value or more. In contrast, the second embodiment differs from the first embodiment in that the candidate target is not registered. In the second embodiment, if is determined that the second registration requirements have been set for a target having continuity with the candidate target in the processing of the step S6 or if the second registration requirements are set for the candidate target in the processing of the step S26, the candidate target is not registered.

2. Effects Provided by Target Recognition Device 1

According to the second embodiment described above, the effects (1A) and (1B) of the first embodiment described above are provided, and the following effects are further provided.

(2A) The target recognition device 1 does not register the target determined to satisfy all of conditions J1 to J3. Hence, the target recognition device 1 can further suppress registering a ghost or the like as a target.

Other Embodiments

The present disclosure is not limited to the embodiments described above and may be variously modified.

(1) The second registration requirements may be other requirements as long as they are more difficult to satisfy than the first registration requirements.

(2) If a negative determination is made in the step S5, the present process may always proceed to the step S7. That is, the target recognition device 1 may not perform the determination in the step S6. If the determination in the step S6 is not performed, if the candidate target satisfies not all of conditions J1 to J3 in the current cycle even though the second registration requirements have been set in the past for the target having continuity with the candidate target, the first registration requirements are set for the candidate target.

(3) The target recognition device 1 and the method thereof disclosed in the present disclosure may be realized by a dedicated computer that is configured to include a memory and a processor programmed to execute one or a plurality of functions embodied by a computer program. Alternatively, the target recognition device 1 and the method thereof disclosed in the present disclosure may be realized by a dedicated computer configured to include a processor consisting of one or more dedicated hardware logic circuits. Alternatively, the target recognition device 1 and the method thereof disclosed in the present disclosure may be realized by one or more dedicated computers configured by a combination of a memory and a processor programmed to execute one or a plurality of functions, with a processor consisting of one or more hardware logic circuits. The computer program may be stored in a computer-readable non-transitory tangible storage medium as instructions executed by a computer. That is, the method realizing functions of parts included in the target recognition device 1 may not necessarily include software. All the functions may be realized by one or a plurality of hardware components.

(4) A plurality of functions of a single component of the above embodiments may be realized by a plurality of components. One function of one component may be realized by a plurality of components. A plurality of functions of a plurality of components may be realized by a single component. One function realized by a plurality of components may be realized by a single component. Furthermore, part of the configuration of the above embodiments may be omitted. Furthermore, at least part of the configuration of the above embodiments may be added to or replaced by another part of the configuration of the embodiments.

(5) The present disclosure may be realized by, in addition to the target recognition device 1 described above, various forms such as a system including the target recognition device 1 as a component, a program for causing a computer to function as the target recognition device 1, a non-transitory tangible recording medium such as a semiconductor memory storing the program, a target recognition method, and a target determination method.

An aspect of the present disclosure is a target recognition device (1) including: a target recognition unit (9) configured to repeat a cycle including processing that radiates radar waves to detect reflection points and processing that recognizes a target by performing clustering for the reflection points; a tracking unit (11) configured to determine continuity between targets recognized in the respective cycles; a target registration unit (13) configured to register targets determined to have continuity by the tracking unit during the cycles the number of which is a threshold value or more; a condition determination unit (15) configured to determine whether targets (31) not registered by the target registration unit satisfy following conditions J1 to J3; and a registration requirement setting unit (17) that sets a requirement for registering the target by the target registration unit to be stricter for targets determined to satisfy all of the conditions J1 to J3 than for targets determined to satisfy not all of the conditions J1 to J3.

The condition J1 is that a ratio of the reflection points (35) having a reflection intensity equal to or lower than a first reference intensity with respect to the reflection points configuring the target to be determined by the condition determination unit.

The condition J2 is that the target (33) including the reflection points having a reflection intensity equal to or higher than a second reference intensity, which is higher than the first reference intensity, is present around the target to be determined by the condition determination unit.

The condition J3 is that a distance between the reflection points having a reference intensity equal to or higher than the second reference intensity and the target to be determined by the condition determination unit is a reference distance or less.

The target determined to satisfy all of the conditions J1 to J3 is highly likely to be due to a ghost or the like. The target recognition device of an aspect of the present disclosure sets a requirement for registering a target to be stricter for the target determined to satisfy all of the conditions J1 to J3 than for the target determined to satisfy not all of the conditions J1 to J3. Hence, the target recognition device of an aspect of the present disclosure can suppress recognizing a ghost or the like as a target and registering the target.

What is claimed is:

1. A target recognition device, comprising:
    a target recognition unit configured to repeat a cycle including processing that radiates radar waves to detect reflection points and processing that recognizes a target by performing clustering for the reflection points;
    a tracking unit configured to determine continuity between targets recognized in the respective cycles;
    a target registration unit configured to register targets determined to have continuity by the tracking unit during the cycles the number of which is a threshold value or more;
    a condition determination unit configured to determine whether an unregistered target recognized in a current cycle satisfies conditions J1 to J3; and
    a registration requirement setting unit that sets a requirement for registering the unregistered target by the target registration unit to be stricter when the unregistered target satisfies all of the conditions J1 to J3 than when the unregistered target does not satisfy all of the conditions J1 to J3, wherein:
        the condition J1 is that a ratio of a first set of unregistered reflection points included in the reflection points with respect to a second set of unregistered reflection points included in the reflection points is higher than or equal to a reference ratio, the second set of unregistered reflection points corresponding to the unregistered target, the first set of unregistered reflection points being a subset of the second set of unregistered reflection points in which the unregistered reflection points included in the first set of unregistered reflection points individually have a reflection intensity equal to or lower than a first reference intensity,
        the condition J2 is that a reference target within a threshold distance of the unregistered target includes one or more high reflection points of the reflection points corresponding thereto that individually have a reflection intensity equal to or higher than a second reference intensity, which is higher than the first reference intensity, and
        the condition J3 is that a distance between at least one of the one or more high reflection points and the unregistered target is a reference distance or less.

2. The target recognition device according to claim 1, wherein:
    the target recognition unit uses a laser radar to radiate waves to detect the reflection points.

3. The target recognition device according to claim 1, wherein;
    the registration requirement setting unit is configured to set the requirement not to register, by the target registration unit, the unregistered target when the unregistered target satisfies all of the conditions J1 to J3.

4. The target recognition device according to claim 1, wherein:
    the registration requirement setting unit sets, as the requirement, the threshold value to be larger for a first unregistered target determined to satisfy all of the conditions J1 to J3 than for a second unregistered target determined to not satisfy all of the conditions J1 to J3.

* * * * *